United States Patent
Lin et al.

(10) Patent No.: US 10,289,691 B2
(45) Date of Patent: May 14, 2019

(54) DYNAMIC REPLICATION OF NETWORKED FILES

(75) Inventors: Zheng Lin, Issaquah, WA (US);
Jonathan M. Class, Snohomish, WA (US); Benjamin W. Schwarz, Bellevue, WA (US); Jeremy S. Russell, Bellevue, WA (US); Beau A. Belgrave, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 750 days.

(21) Appl. No.: 13/456,084

(22) Filed: Apr. 25, 2012

(65) Prior Publication Data
US 2013/0290255 A1 Oct. 31, 2013

(51) Int. Cl.
*G06F 17/30* (2006.01)
*G06F 11/20* (2006.01)

(52) U.S. Cl.
CPC .... *G06F 17/30212* (2013.01); *G06F 11/2094* (2013.01)

(58) Field of Classification Search
CPC ............... G06F 17/30212; G06F 11/2094
See application file for complete search history.

(56) References Cited

U.S. PATENT DOCUMENTS

| | | | |
|---|---|---|---|
| 6,167,438 A * | 12/2000 | Yates et al. ............... | 709/216 |
| 7,191,298 B2 | 3/2007 | Kaminsky et al. | |
| 7,243,103 B2 * | 7/2007 | Murphy et al. | |
| 7,519,726 B2 * | 4/2009 | Palliyil et al. ............ | 709/232 |
| 7,707,180 B2 | 4/2010 | Orbits et al. | |
| 7,802,310 B2 * | 9/2010 | Farber ............... | G06F 17/30091 711/163 |
| 2003/0050924 A1 * | 3/2003 | Faybishenko et al. ......... | 707/3 |
| 2003/0158873 A1 | 8/2003 | Sawdon et al. | |
| 2010/0228774 A1 | 9/2010 | Riemers | |
| 2010/0287219 A1 * | 11/2010 | Caso ............... | G06F 17/30094 707/827 |
| 2011/0246615 A1 | 10/2011 | Hahn et al. | |

OTHER PUBLICATIONS

Braam, Peter J., "The Coda Distributed File System", *School of Computer Science*, Carnegie Mellon University, retrieved from <http://www.coda.cs.cmu.edu/ljpaper/lj.html> on Nov. 22, 2011, 10 pages.

(Continued)

*Primary Examiner* — Usmaan Saeed
*Assistant Examiner* — Paul Kim

(57) ABSTRACT

In embodiments of dynamic replication of networked files, a process that utilizes file system objects is executed on a computing device. A file system request that is initiated by the process for a requested file system object can be intercepted, and a determination is made as to whether the requested file system object exists based on file system metadata. The file system request from the process is returned if the requested file system object is stored on the computing device. Alternatively, replication of the requested file system object is initiated from a networked peer device that has the requested file system object to replicate the file system object to the computing device. Alternatively, an indication that the requested file system object does not exist can be returned to the process.

20 Claims, 4 Drawing Sheets

(56) References Cited

OTHER PUBLICATIONS

Nightingale, Edmund B., et al., "Speculative Execution in a Distributed File System", *SOSP'05*, retrieved from <http://www.eecs.berkeley.edu/~brewer/cs262/speculator-nightingale.pdf> on Nov. 22, 2011,(Oct. 26, 2005),pp. 191-205.

Weil, Sage A., et al., "Ceph: A Scalable, High-Performance Distributed File System", *OSDI*, retrieved from <http://www.ssrc.ucsc.edu/Papers/weil-osdi06.pdf> on Nov. 22, 2011,(Nov. 8, 2006),14 pages.

* cited by examiner

DYNAMIC REPLICATION OF NETWORKED FILES

BACKGROUND

Related processes may be distributed across networked computing devices that each executes some aspect of a process or processes. A consuming process can encounter resource problems when performing operations against multiple files that are not maintained on a local computing device that executes the process. These files often exist at any number of distributed network locations, and the network locations may contain a set of the files needed for local operations. The initial time to configure the environment for the specific operations to be completed is non-trivial when considering the full set of available networked files and that a subset of those files are needed for the specific operations (e.g., acquisition of the files can be excessively broad, or manually specified and maintained).

Additionally, for files which are not yet available at the networked locations, a consuming process that is executing on a computing device will not know which networked computing device will produce a needed file, nor will the process know when the needed file has become available on one or more of the networked computing devices. Due to these limitations to obtain distributed files, many computing devices are implemented to host all of the files needed for a process and/or operation on a single file server behind a single network tap. This can result in network saturation when multiple computing devices connect to the single file server.

SUMMARY

This Summary introduces simplified concepts of dynamic replication of networked files, and the concepts are further described below in the Detailed Description and/or shown in the Figures. This Summary should not be considered to describe essential features of the claimed subject matter, nor used to determine or limit the scope of the claimed subject matter.

Dynamic replication of networked files is described. In embodiments, a process that utilizes file system objects is executed on a computing device in a system of networked devices. A file system request that is initiated by the process for a requested file system object can be intercepted, and a determination is made as to whether the requested file system object exists based on file system metadata. The file system request from the process is returned if the requested file system object is stored locally on the computing device. Alternatively, replication of the requested file system object is initiated from a networked peer device to the computing device if the requested file system object is available on the networked peer device. Alternatively, an indication that the requested file system object does not exist can be returned to the process.

In other embodiments, the computing device can communicate with the networked peer device via a data path to replicate the requested file system object to the computing device. The file system metadata includes the data path to access the requested file system object if the requested file system object is available on the networked peer device. The computing device can also determine duplicative file system objects and whether the requested file system object is current based on a signature of the requested file system object. The signature of a file system object can be part of the file system metadata.

In other embodiments, the process that is executing on the computing device may generate a new file system object, and metadata of the new file system object is registered to a distributed file system controller that publishes the metadata to the networked peer devices. The computing device and the networked peer devices receive file system metadata from the distributed file system controller, which manages the file system metadata for file system objects that are available from the networked peer devices and on the computing device.

BRIEF DESCRIPTION OF THE DRAWINGS

Embodiments of dynamic replication of networked files are described with reference to the following Figures. The same numbers may be used throughout to reference like features and components that are shown in the Figures.

DETAILED DESCRIPTION

Dynamic replication of networked files is described. In embodiments files for processing a task or operation can be replicated and dynamically available, which reduces unnecessary input/output (IO) for both network and local disk, and improves network IO by distributing network IO requests across a pool of networked computing devices. A file intercept service is implemented to intercept file IO requests that are initiated by monitored processes to determine if requested file system objects that are needed for processing a task or operation already exist locally and are current (e.g., most recent, or up-to-date). If a requested file system object is not available locally or is not current, communication with networked resources (e.g., other networked computing devices) can be initiated to locate the current file instance. When the requested file system object and/or file version is available and has been located, the requested file system object can be replicated locally and the related process is able to continue execution against the now local file.

While features and concepts of dynamic replication of networked files can be implemented in any number of different devices, systems, environments, networks, and/or configurations, embodiments of dynamic replication of networked files are described in the context of the following example devices, systems, and methods.

Figure 1:
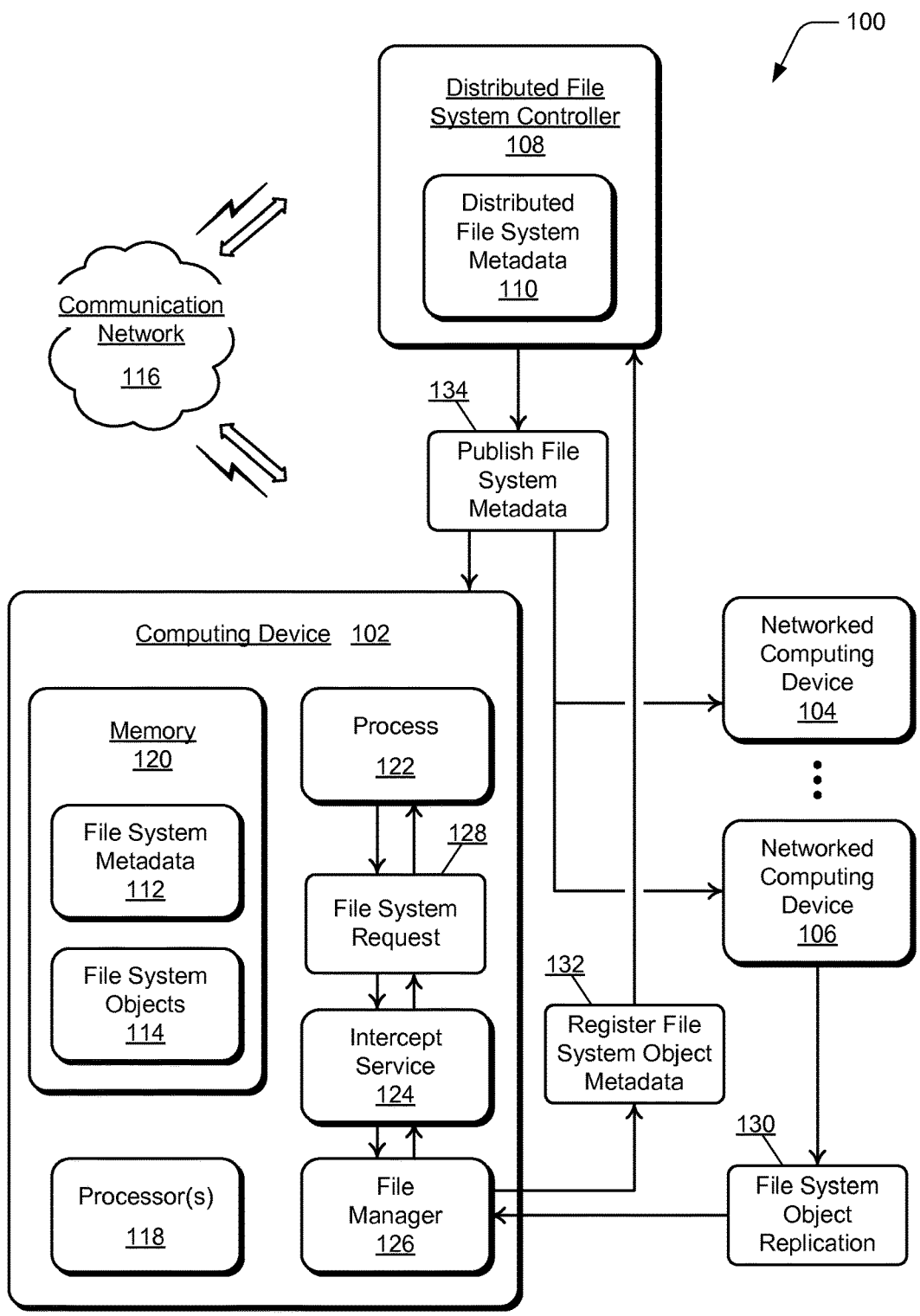
FIG. 1 illustrates an example distributed file system in which embodiments of dynamic replication of networked files can be implemented.

FIG. 1 illustrates an example distributed file system 100 in which embodiments of dynamic replication of networked files can be implemented. The example system includes any number of networked computing devices, such as the networked computing devices 102, 104, and 106 (also referred to herein as computing devices and/or networked peer devices). The computing device 102 is an example implementation of any of the networked computing devices in the example system, and the computing devices may be any type of a computer, server, dedicated machine, state machine, and the like.

The example distributed file system 100 also includes a distributed file system controller 108 that is implemented to maintain and publish distributed file system metadata 110 to the various networked computing devices, such as the example computing device 102. The distributed file system metadata corresponds to file system objects that are distributed to the networked computing devices in the distributed file system. For example, the computing device 102 maintains file system metadata 112 for file system objects 114. The file system objects can include any type of files, data, objects, libraries, headers, and the like that a process may utilize to perform tasks and/or operations on the computing device.

The distributed file system controller 108 registers and publishes the distributed file system metadata 110 that corresponds to the file system objects, rather than the file system objects themselves because not all of the networked computing devices will utilize all of the content from all of the other devices. The distributed file system metadata 110 provides the various networked computing devices in the distributed file system with a consistent view of the available file system objects in the system. Although shown and described as an independent device, entity, or service of the distributed file system, the distributed file system controller may be implemented as a scaled-out redundant service on multiple devices of the system. Alternatively or in addition, the distributed file system controller 108 may be implemented as a component or service that is executed by one of the networked computing devices, such as computing device 102.

Any of the networked computing devices and the distributed file system controller 108 can communicate via a communication network 116, which can be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cellphone provider, and/or Internet service provider. A mobile operator can facilitate mobile data and/or voice communication for any type of a wireless device or mobile phone (e.g., cellular, VoIP, WiFi, etc.).

The computing device 102 can be implemented with various components, such as one or more processors 118 (CPUs) and memory 120 (e.g., computer-readable storage media) that enable data storage. The computing device may also include any number and combination of differing components as further described with reference to the example device shown in FIG. 4. The processors and memory of the computing device execute a process 122, such as computer-executable instructions and/or a software application that utilizes the file system objects 114 for execution on the computing device to perform tasks and/or operations. The process 122 is representative of any program, utility, automation process, a build-test scenario, and any other type of executable process that may utilize distributed file system objects to perform tasks and/or operations.

In embodiments, the computing device 102 includes an intercept service 124 and a file manager 126, both of which can be implemented as computer-executable instructions, such as software applications, and executed by the one or more processors 118 to implement the various embodiments described herein. Although shown and described as independent components of the computing device, the file manager and the intercept service may be implemented together as a module, component, application, service, or other controller of the computing device to implement embodiments of dynamic replication of networked files. Additionally, the file manager and/or the intercept service can be implemented with any type of operating system and/or in various computing-platforms.

The process 122 executes on the computing device 102 and can initiate a file system request 128 for a file system object, such as a file system object 114 stored locally on the computing device 102 or a file system object that may exist on one of the other networked computing devices. In embodiments, the intercept service 124 is implemented to intercept the file system request that is initiated by the process for a requested file system object. In implementations, the intercept service 124 is a component that can initiate a call to the file manager 126, which is a component of the computing device 102. The intercept service 124 can be implemented as a file filter in the system stack; as an intercept mechanism for API-level calls to the file system; and/or by any other technique to intercept file system requests that are initiated from a process, program, utility, and the like.

The file manager 126 is implemented to then determine from the file system metadata 112 whether the requested file system object exists in the distributed file system. The file system metadata identifies file system objects that are available on the computing device (e.g., the local file system objects 114) and from the various networked computing devices. When the file manager 126 makes the determination from the file system metadata 112 whether the requested file system object exists in the distributed file system, the file manager is implemented to initiate a response or replication of the requested file system object. For example, the file manager can return the file system request 128 from the process 122 if the requested file system object is stored locally on the computing device 102 (e.g., as one of the file system objects 114). Alternatively, the file manager can return an indication that the requested file system object does not exist if the requested file system object is not stored on the computing device and is not available from one of the other networked computing devices. Additionally, if the requested file system object does not exist, but the requested file system object is to be opened with a create request, then the file system object will be created locally at the computing device 102.

If the requested file system object is available from one of the other networked computing devices, the file manager 126 can initiate replication of the requested file system object from a networked computing device to the computing device. For example, the file manager initiates file system object replication 130 of the requested file system object from the networked computing device 106 to the computing device 102. In embodiments, the file system metadata 112 describes the origination of a file system object and includes a data path to access the file system object. The file manager 126 communicates with the networked computing device 106 via the data path to replicate the requested file system object to the computing device.

The file manager uses the file system metadata 112 as a data point to request and replicate the requested file system object. In the embodiments described herein, it is not necessary for the file manager 126 to go through the distributed file system controller 108 to access a file system object because the file system metadata describes where to access the requested file system object. However, in alternate implementations, the file manager can be implemented to communicate with the distributed file system controller to replicate a file system object and/or update the replication state of the file system object.

With file system object replication 130, the requested file system object appears to be available locally on the computing device 102. The process 122 is insulated from the file system object replication, and from the fact that the requested file system object is obtained from a remote networked computing device. Further, the requested file system object only needs to be replicated to the computing device 102 one time, and as a run-time event. A remote file system object is dynamically turned into a local file system object in embodiments of dynamic replication of networked files.

In other embodiments, the process 122 executes on the computing device 102 and may generate a new file system object 114 in the course of performing the tasks and/or operations. A networked computing device may then be both a consumer and producer of the file system objects in the distributed file system. The file manager 126 is implemented to register file system object metadata 132 of the new file system object to the distributed file system controller 108. The distributed file system controller can then publish 134 the file system metadata to any number of networked computing devices, such as the networked computing devices 102, 104, and 106.

Similarly, any of the networked computing devices may register file system object metadata for new file system objects to the distributed file system controller, which then publishes the file system metadata to the networked computing devices. The file manager 126 can then receive the file system metadata from the distributed file system controller. The distributed file system metadata is then stored at the computing device as the file system metadata 112, which indicates the file system objects that are available in the distributed file system from networked computing devices and on the computing device 102.

In the embodiments described herein, a consumer device (e.g., the networked computing device 102) does not need to update back to the distributed file system controller 108 when the device replicates a file system object from another one of the networked computing devices. The distributed file system controller does not need to track which of the networked computing devices have which file system objects. Rather, the distributed file system metadata 110 that is maintained by the distributed file system controller indicates which of the networked computing devices generated the original file system object. However, in alternate implementations, the distributed file system controller can be implemented to track the state of all file system objects on all of the networked computing devices.

In other embodiments, the file system metadata 112 may include a signature of the requested file system object to compute if an instance of the local file system object is current. The file manager 126 is implemented to determine duplicative file system objects and whether the requested file system object is current (e.g., most recent, or up-to-date) based on the signature of the requested file system object. A signature of the file system objects can also facilitate identifying file deltas for build logic to patch exceptions. For example, if two file system objects are identified as being the same file (e.g., have the same file name), but the signature for the two files does not correlate, then a determination can be made as to which one of the two files to distribute across the distributed file system and which of the networked computing devices to update.

Example methods 200 and 300 are described with reference to respective FIGS. 2 and 3 in accordance with one or more embodiments of dynamic replication of networked files. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 2:
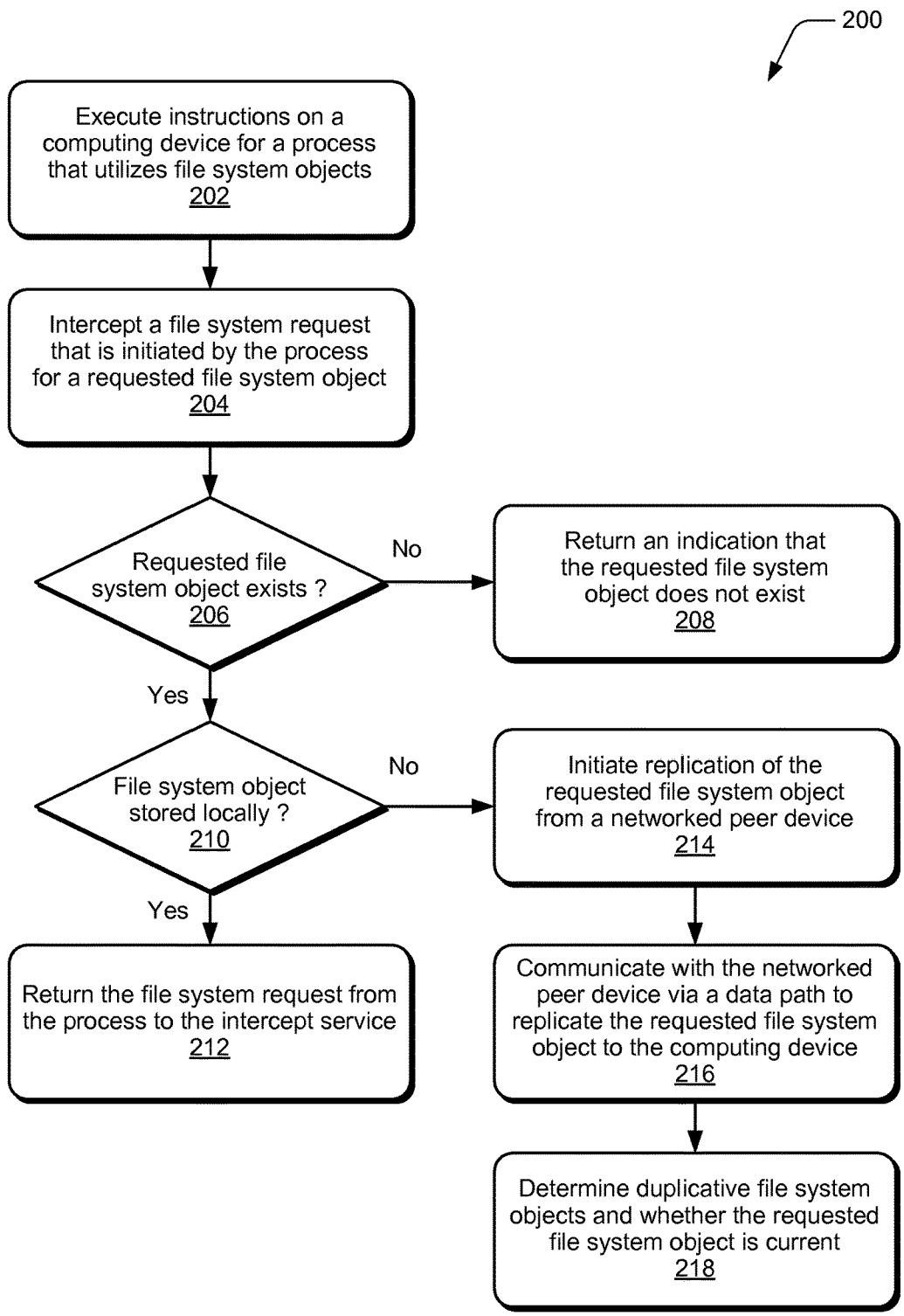
FIG. 2 illustrates example method(s) of dynamic replication of networked files in accordance with one or more embodiments.

FIG. 2 illustrates example method(s) 200 of dynamic replication of networked files. The order in which the method blocks are described are not intended to be construed as a limitation, and any number of the described method blocks can be combined in any order to implement a method, or an alternate method.

At block 202, instructions are executed on a computing device for a process that utilizes file system objects. For example, the process 122 (FIG. 1) is executed as instructions by a processor 118 on the computing device 102, and the process utilizes file system objects, to include the file system objects 114 that are maintained locally on the computing device.

At block 204, a file system request that is initiated by the process for a requested file system object is intercepted. For example, the intercept service 124 at the computing device 102 intercepts the file system request 128, which is initiated by the process 122 for a requested file system object.

At block 206, a determination is made as to whether the requested file system object exists. For example, the file manager 126 at the computing device 102 determines from the file system metadata 112 whether the requested file system object exists. The file system metadata identifies the file system objects that are available from the various networked computing devices in the distributed file system.

If the requested file system object does not exist (i.e., "no" from block 206), then at block 208, an indication is returned that the requested file system object does not exist. For example, the file manager 126 returns an indication that the requested file system object does not exist if the requested file system object is not stored on the computing device 102 and is not available from any of the networked computing devices 104 and 106.

If the requested file system object does exist (i.e., "yes" from block 206), then at block 210, a determination is made as to whether the requested file system object is stored locally. For example, the requested file system object may already be available locally at the computing device 102 as one of the file system objects 114.

If the requested file system object is stored locally (i.e., "yes" from block 210), then at block 212, the file system request from the process is returned to the intercept service. For example, the file manager 126 returns the file system request 128 to the intercept service 124, and the requested file system object (e.g., one of the file system objects 114) is returned to the process 122.

If the requested file system object is not stored locally (i.e., "no" from block 210), then at block 214, replication is initiated for the requested file system object from a networked peer device to the computing device. For example, the file manager 126 initiates the file system object replication 130 of the requested file system object from the network computing device 106 to the computing device 102 if the requested file system object is available on that networked computing device.

At block 216, the networked peer device is communicated with via a data path to replicate the requested file system object to the computing device. For example, the file system metadata 112 includes a data path to access the requested file system object, and the file manager 126 communicates with the networked computing device 106 via the data path to replicate the requested file system object to the computing device.

At block 218, duplicative file system objects are determined, as well as whether the requested file system object is current. For example, the file system metadata 112 includes a signature of the requested file system object to compute if an instance of the local file system object is current. The file manager 126 determines duplicative file system objects and whether the requested file system object is current (e.g., most recent, or up-to-date) based on the signature of the requested file system object that is included in the file system metadata.

Figure 3:
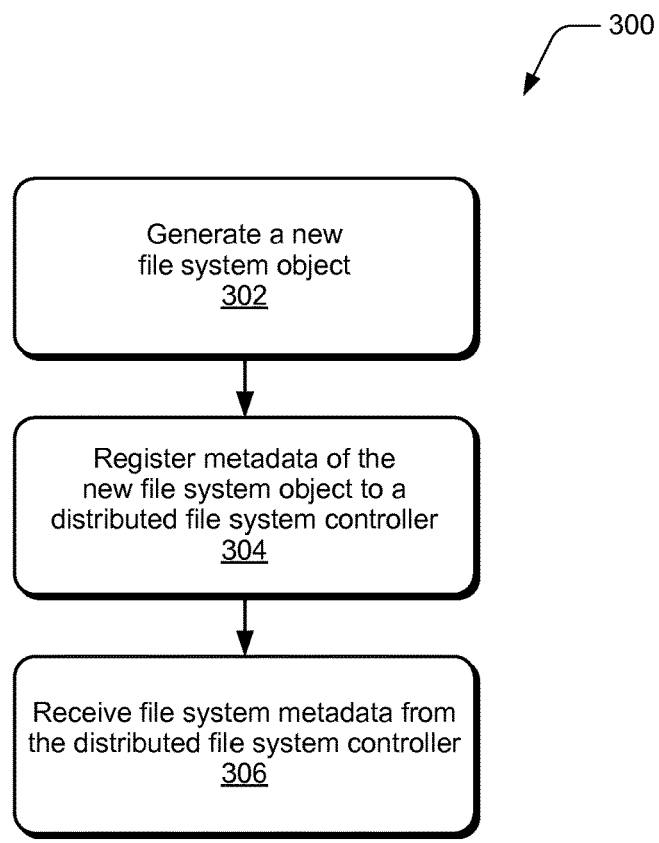
FIG. 3 illustrates additional example method(s) of dynamic replication of networked files in accordance with one or more embodiments.

FIG. 3 illustrates example method(s) 300 of dynamic replication of networked files. The order in which the method blocks are described are not intended to be construed as a limitation, and any number of the described method blocks can be combined in any order to implement a method, or an alternate method.

At block 302, a new file system object is generated. For example, the process 122 at the computing device 102 (FIG. 1) generates a new file system object 114 that can be utilized by any of the other networked computing devices. At block 304, metadata of the new file system object is registered to a distributed file system controller. For example, the file manager 126 at the computing device 102 registers the file system object metadata 132 of the new file system object to the distributed file system controller 108, which then publishes the file system metadata to the networked computing devices.

At block 306, file system metadata is received from the distributed file system controller. For example, the networked computing devices (to include computing device 102) receives the distributed file system metadata 110 from the distributed file system controller 108, which publishes the file system metadata that corresponds to the file system objects that are available from the networked computing devices and on the computing device.

Figure 4:
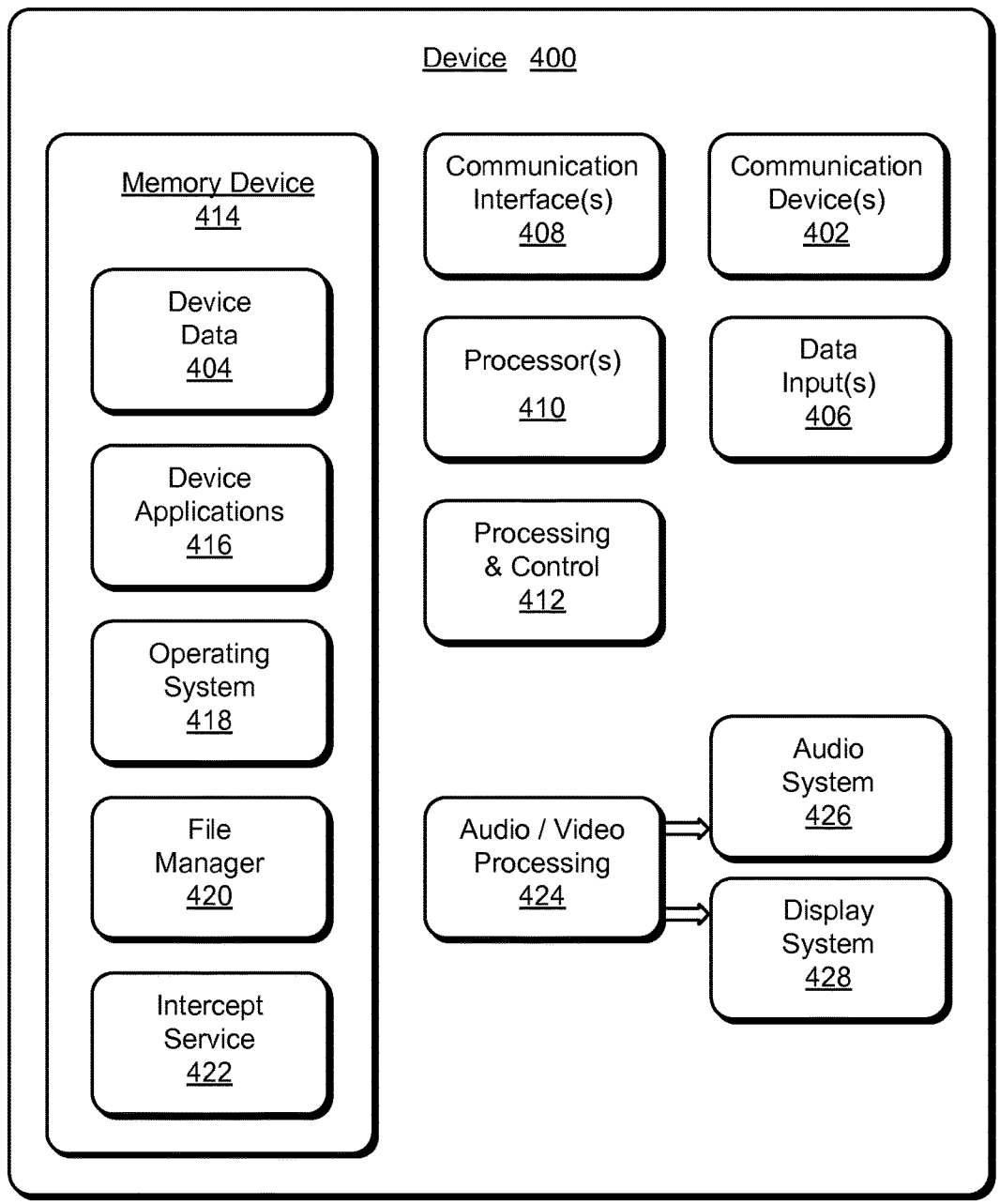
FIG. 4 illustrates various components of an example device that can implement embodiments of dynamic replication of networked files.

FIG. 4 illustrates various components of an example device 400 that can be implemented as any of the computing devices described with reference to the previous FIGS. 1-3. In embodiments, the device may be implemented as any one or combination of a fixed or mobile device, in any form of a consumer, computer, server, portable, user, communication, phone, navigation, television, appliance, gaming, messaging, Web browsing, media playback, and/or other type of electronic device. The device may also be associated with a user (i.e., a person) and/or an entity that operates the device such that a device describes logical devices that include users, software, firmware, hardware, and/or a combination of devices.

The device 400 includes communication devices 402 that enable wired and/or wireless communication of device data 404, such as received data, data that is being received, data packets of the data, transmitted data, etc. For example, the device data 404 can include the file system objects 114 and the file system metadata 112 (FIG. 1). The device data or other device content can include configuration settings of the device, media content stored on the device, and/or information associated with a user of the device. Media content stored on the device can include any type of audio, video, and/or image data.

The device also includes one or more data inputs 406 via which any type of data, media content, and/or inputs can be received, such as user-selectable inputs, messages, communications, music, television content, recorded video content, and any other type of audio, video, and/or image data received from any content and/or data source. The data inputs 406 may include USB ports, coaxial cable, and other serial or parallel connectors (including internal connectors) for flash memory, DVDs, CDs, and the like. The data inputs can be used to couple the device to components, peripherals, and accessories, such as keyboards, microphones, cameras, and any other type of input devices. The device 400 also includes communication interfaces 408, such as any one or more of a network, wired, or wireless interface. The communication interfaces provide a connection and/or communication links between the device and a communication network by which other electronic, computing, and communication devices communicate data with the device.

The device 400 includes one or more processors 410 (e.g., any of microprocessors, controllers, and the like), or a processor and memory system (e.g., implemented in an SoC), which process various computer-executable instructions to control the operation of the device. Alternatively or in addition, the device can be implemented with any one or combination of software, hardware, firmware, or fixed logic circuitry that is implemented in connection with processing and control circuits which are generally identified at 412. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 400 also includes one or more memory devices 414 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 414 provides data storage mechanisms to store the device data 404, other types of information and/or data, and various device applications 416 (e.g., software applications). For example, an operating system 418 can be maintained as a software application with a memory device and executed by the processors. The device applications may also include a device manager, such as any form of a control application, software application, signal-processing and control module, code that is native to a particular device, a hardware abstraction layer for a particular device, and so on. In embodiments, the device applications include a file manager 420 and an intercept service 422. Example implementations of the file manager 420 and the intercept service 422 are described with reference to the file manager 126 and the intercept service 124 implemented in computing device 102 (FIG. 1). The file manager 420 and the intercept service 422 are shown as software modules and/or computer applications. Alternatively or in addition, the file manager 420 and/or the intercept service 422 can be implemented as hardware, software, firmware, fixed logic, or any combination thereof.

The device 400 also includes an audio and/or video processing system 424 that processes and/or generates audio data for an audio system 426 and display data for a display system 428. The audio system and/or the display system may include any devices that process, display, and/or otherwise render audio, video, display, and/or image data. Display data and audio signals can be communicated to an audio component and/or to a display device via an RF (radio frequency) link, S-video link, HDMI (high-definition multimedia interface), composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of dynamic replication of networked files have been described in language specific to features and/or methods, the subject of the appended claims is not necessarily limited to the specific features or methods described. Rather, the specific features and methods are disclosed as example implementations of dynamic replication of networked files.

The invention claimed is:

1. A computer-implemented method, comprising:
   executing instructions on a client computing device for a process that utilizes one or more file system objects;
   intercepting, by the client computing device, a file system request that is initiated by the process for a requested file system object;
   determining, by the client computing device, from file system metadata stored at the client computing device whether the requested file system object exists;
   initiating, by the client computing device, replication of the requested file system object from a networked peer device to the client computing device responsive to determining that the requested file system object is available on the networked peer device; and
   registering, by the client computing device, metadata of the replicated file system object that is stored at the client computing device, the metadata of the replicated file system object including a data path for the replicated file system object that is stored at the client computing device and identification of the replicated file system object at the client computing device as current, to a distributed file system controller that publishes the metadata of the replicated file system object to the networked peer device.

2. A computer-implemented method as recited in claim 1, further comprising returning the file system request from the process if the requested file system object is stored on the client computing device.

3. A computer-implemented method as recited in claim 1, further comprising returning an indication that the requested file system object does not exist if the requested file system object is not stored on the client computing device and is not available from the networked peer device.

4. A computer-implemented method as recited in claim 1, further comprising communicating with the networked peer device via a data path specified in the file system metadata stored at the client computing device to request the requested file system object for replication to the client computing device.

5. A computer-implemented method as recited in claim 1, further comprising:
   generating a new file system object on the client computing device that intercepted the file system request;
   storing the new file system object and metadata of the new file system object at the client computing device; and
   registering the metadata of the new file system object to the distributed file system controller that publishes the metadata of the new file system object to the networked peer device, the metadata of the new file system object configured to include a data path for the new file system object at the client computing device.

6. A computer-implemented method as recited in claim 1, further comprising receiving the file system metadata from the distributed file system controller that publishes the file system metadata for file system objects that are available from networked peer devices and on the client computing device.

7. A computer-implemented method as recited in claim 1, further comprising determining duplicative file system objects with different signatures on the client computing device and on the networked peer device, and whether the requested file system object is current based on a signature of the requested file system object that is included in the file system metadata.

8. A client computing device, comprising:
   a memory and processor system configured to execute instructions for a process that utilizes one or more file system objects;
   an intercept service implemented by the memory and processor system, the intercept service executable to intercept a file system request that is initiated by the process for a requested file system object;
   a file manager configured to:
      determine from file system metadata stored at the client computing device whether the requested file system object exists;
      initiate replication of the requested file system object from a networked peer device to the client computing device if the requested file system object is available on the networked peer device; and register the metadata of the replicated file system object that is maintained at the client computing device to a distributed file system controller that publishes the metadata of the replicated file system object to the networked peer device, the metadata of the new file system object including a data path for the replicated file system object that is maintained at the client computing device and identification of the replicated file system object as current.

9. A client computing device as recited in claim 8, wherein the file manager is configured to return the file system request from the process if the requested file system object is stored on the client computing device.

10. A client computing device as recited in claim 8, wherein the file manager is configured to return an indication that the requested file system object does not exist if the requested file system object is not stored on the client computing device and is not available from the networked peer device.

11. A client computing device as recited in claim 8, wherein:
the file system metadata stored at the client computing device includes a data path to access the requested file system object at the networked peer device; and
the file manager communicates with the networked peer device via the data path to request the requested file system object for replication to the client computing device.

12. A client computing device as recited in claim 8, wherein:
the process is configured to generate a new file system object on the client computing device; and
the file manager is configured to register metadata of the new file system object to the distributed file system controller that publishes the metadata to the networked peer device, the metadata of the new file system object configured to include a data path for the new file system object on the client computing device.

13. A client computing device as recited in claim 8, wherein the file manager is configured to receive the file system metadata from the distributed file system controller that publishes the file system metadata for file system objects that are available from networked peer devices and on the computing client device.

14. A client computing device as recited in claim 8, wherein:
the file system metadata includes a signature of the requested file system object; and
the file manager is configured to determine duplicative file system objects and whether the requested file system object is current based on the signature of the requested file system object.

15. A networked system of client computing devices, comprising:
file system objects that are maintained on the networked system of client computing devices;
a distributed file system controller configured to publish file system metadata to each of the client computing devices, the file system metadata corresponding to the file system objects and identifying the file system objects as a current version with a signature;
a process that utilizes one or more file system objects, the process configured for execution on a client computing device;
an intercept service executable on the client computing device, the intercept service configured to intercept a file system request that is initiated by the process for a requested file system object; and
a file manager configured to:
determine from the file system metadata whether the requested file system object exists on the client computing device or is available on a networked client computing device; and
determine duplicative file system objects with a same file name and with different signatures on the client computing device and on the networked peer device, and whether the requested file system object is current based on the signature of the requested file system object.

16. A networked system of client computing devices as recited in claim 15, wherein the file manager is configured to initiate replication of the requested file system object from the networked client computing device to the client computing device if the requested file system object is available on the networked client computing device.

17. A networked system of client computing devices as recited in claim 15, wherein the file manager is configured to one of:
return the file system request from the process if the requested file system object exists on the client computing device; or
return an indication that the requested file system object does not exist.

18. A networked system of client computing devices as recited in claim 15, wherein:
the file system metadata includes a data path to access the requested file system object at the networked client computing device; and
the file manager communicates with the networked client computing device via the data path to request the requested file system object for replication to the client computing device.

19. A networked system of client computing devices as recited in claim 15, wherein:
the process is configured to generate a new file system object on the client computing device; and
the file manager is configured to register metadata of the new file system object to the distributed file system controller that publishes the metadata to each of the client computing devices, the metadata of the new file system object configured to include a data path for the new file system object on the client computing device.

20. A networked system of client computing devices as recited in claim 15, wherein the distributed file system controller is implemented as a scaled-out service on the client computing device and on at least one other networked client computing device.

* * * * *